United States Patent
Kim et al.

(10) Patent No.: US 8,392,782 B2
(45) Date of Patent: Mar. 5, 2013

(54) APPARATUS AND METHOD FOR PROCESSING AUTO REPEAT REQUEST IN MULTIPLE INPUT MULTIPLE OUTPUT SYSTEM

(75) Inventors: Yunjoo Kim, Suwon (KR); Yoo-Seung Song, Daejeon (KR); Jee-Yon Choi, Daejeon (KR); Hyungu Park, Seoul (KR); Sok-Kyu Lee, Daejeon (KR); Kyounghee Song, Jeonju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 387 days.

(21) Appl. No.: 12/745,736

(22) PCT Filed: Jun. 13, 2008

(86) PCT No.: PCT/KR2008/003318
§ 371 (c)(1),
(2), (4) Date: Jun. 2, 2010

(87) PCT Pub. No.: WO2009/072710
PCT Pub. Date: Jun. 11, 2009

(65) Prior Publication Data
US 2010/0257422 A1    Oct. 7, 2010

(30) Foreign Application Priority Data

Dec. 3, 2007 (KR) .................. 10-2007-0124388

(51) Int. Cl.
*G06F 11/00* (2006.01)
(52) U.S. Cl. ........................ 714/748; 714/708
(58) Field of Classification Search .............. 714/704, 714/708, 748; 370/230, 231
See application file for complete search history.

(56) References Cited

U.S. PATENT DOCUMENTS

| | | | |
|---|---|---|---|
| 6,779,146 B1 | 8/2004 | Jones et al. | |
| 7,249,303 B2 | 7/2007 | Dottling et al. | |
| 7,778,340 B2 * | 8/2010 | Zhengang et al. | 375/260 |

(Continued)

FOREIGN PATENT DOCUMENTS

| | | |
|---|---|---|
| KR | 1020010002918 A | 1/2001 |
| KR | 1020030015963 A | 2/2003 |

(Continued)

OTHER PUBLICATIONS

Sangheetha Salai Parthasarathy et al., "A Novel Adaptive Scheme to Improve the Performance of IEEE 802.1 1n WLANs," $21^{st}$ International Conference on Advanced Information Networking and Applications Workshops, May 21-23, 2007, pp. 334-339, vol. 2, IEEE.

(Continued)

*Primary Examiner* — Marc Duncan

(57) ABSTRACT

Provided are an apparatus and method for processing an ARQ in a MIMO system. The apparatus includes a storing unit for storing reordering thresholds of each receiving terminal and retransmission data; a priority managing unit for assigning a priority to a plurality of antenna groups in ascending order of a bit error rate of a wireless channel of each antenna group and managing the plurality of antenna groups based on the priorities; a data transmitting unit for transmitting retransmission data; and a controlling unit for controlling the data transmitting unit to transmit retransmission data within a range not exceeding a reordering threshold of a corresponding receiving terminal sequentially using an antenna group having the highest priority first.

10 Claims, 3 Drawing Sheets

U.S. PATENT DOCUMENTS

| | | | |
|---|---|---|---|
| 2003/0083016 A1* | 5/2003 | Evans et al. | 455/67.1 |
| 2004/0196919 A1* | 10/2004 | Mehta et al. | 375/267 |
| 2006/0034244 A1* | 2/2006 | Huang et al. | 370/344 |
| 2008/0086662 A1* | 4/2008 | Li et al. | 714/704 |
| 2008/0244350 A1* | 10/2008 | de Carvalho et al. | 714/748 |
| 2009/0013232 A1* | 1/2009 | Wan et al. | 714/748 |
| 2011/0188547 A1* | 8/2011 | Catreux-Erceg et al. | 375/147 |
| 2012/0077447 A1* | 3/2012 | Rofougaran | 455/73 |

FOREIGN PATENT DOCUMENTS

| | | |
|---|---|---|
| KR | 1020030072385 A | 9/2003 |
| KR | 1020030075886 A | 9/2003 |
| KR | 1020070022038 A | 2/2007 |
| KR | 1020070086267 A | 8/2007 |
| KR | 1020070087985 A | 8/2007 |
| WO | WO 03/019817 A1 | 3/2003 |

OTHER PUBLICATIONS

International Search Report for PCT/KR2008/003318 filed Jun. 13, 2008.

Written Opinion of the International Searching Authority for PCT/KR2008/003318 filed Jun. 13, 2008.

* cited by examiner

APPARATUS AND METHOD FOR PROCESSING AUTO REPEAT REQUEST IN MULTIPLE INPUT MULTIPLE OUTPUT SYSTEM

TECHNICAL FIELD

The present invention relates to an apparatus and method for processing an auto repeat request in a multiple input multiple output (MIMO) system; and, more particularly, to an apparatus and method for processing an automatic retransmission request (ARQ) in a MIMO system, which assign a priority to each antenna group in ascending order of a bit error rate and retransmit data sequentially using an antenna group having the highest priority first within a reordering threshold range in order to reduce retransmission data error and retransmission time.

This work was supported by the IT R&D program of MIC/IITA [2006-S-002-02, "IMT-Advanced Radio Transmission Technology with Low Mobility"].

BACKGROUND ART

It is one of objects of a next generation wireless communication system to provide various data services as well as voice service. In order to provide the various data services, it is necessary to develop a high speed data communication technology that supports a data transmit rate of several Gigabits per second (Gbps).

A Multiple Input Multiple Output (MIMO) system uses a plurality of transmitting and receiving antennas for transmitting and receiving data. The MIMO system may incredibly increase channel capacity compared to a system using one transmitting antenna and one receiving antenna.

In order to realize such theoretical channel capacity gain of the MIMO system, various methods were introduced, such as Spatial Multiplexing and Space-Time codes.

The Spatial Multiplexing is a technology for simultaneously transmitting a plurality of data through different transmitting antennas. Therefore, the Spatial Multiplexing increases system capacity without system bandwidth increased additionally. Vertical-Bell Laboratory Layered Space-Time is one of the representative schemes thereof.

The Time-Space Code is a technology for obtaining diversity and coding gain at the same time by assigning proper codes to a data stream and transmitting data at a plurality of time slots through a plurality of antennas. Space-Time block codes is one of representative schemes thereof.

For example, in a 2×2 MIMO system, a receiver receives a signal transmitted through one or more antennas from a transmitter by properly dividing the received signal. Therefore, the receiver can receive two data streams at one time slot. Also, a data error rate can be reduced by transmitting two data streams through two antennas.

That is, the MIMO system having multiple transmitting and receiving antennas can transmit at least one of data streams at the same time because of increment of transmission paths. Also, a receiving error is not generated from all of transmission paths or one predetermined wireless path.

Auto Repeat reQuest (ARQ) is a method for retransmitting corresponding data at a transmitting end when error is generated from received data at a receiving end.

Although ARQ has comparative simple structure, the ARQ provides high reliability. For example, if a receiver detects error from received data using a cyclic redundancy check (CRC) code which has superior error detection capability, a transmitter requests retransmission of the data. As a result, the reliability is improved through re-transmission.

ARQ is classified into Stop and Wait (SW), Go-Back-N (GBN), and Selective Repeat (SR). The SR advantageous has high data transmit efficiency compared to the SW and the GBN. However, the realization complexity of the SR is very high.

In ARQ, data retransmission is generally performed at a medium access control (MAC) layer. The MAC layer can retransmit a corresponding MAC Protocol Data Unit (MPDU) as many times as a predefined maximum retransmission time. If it fails to re-transmit the data unit within the maximum retransmission time, the corresponding data unit is discarded.

Therefore, whether to successfully retransmit a data unit within the maximum re-transmission time is a very important factor because system performance depends thereon.

DISCLOSURE OF INVENTION

Technical Problem

An embodiment of the present invention is directed to providing a method for reducing retransmission times by minimizing retransmission data error in a multiple input multiple output (MIMO) system.

An embodiment of the present invention is also directed to providing an apparatus and method for processing an automatic retransmission request (ARQ) in a MIMO system, which assign a priority to each antenna group in ascending order of a bit error rate and retransmit data sequentially using an antenna group having the highest priority first within a reordering threshold range in order to reduce retransmission data error and retransmission time.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an apparatus for processing an auto repeat request, including: a storing unit for storing reordering thresholds of each receiving terminal and retransmission data; a priority managing unit for assigning a priority to a plurality of antenna groups in ascending order of a bit error rate of a wireless channel of each antenna group and managing the plurality of antenna groups based on the priorities; a data transmitting unit for transmitting retransmission data; and a controlling unit for controlling the data transmitting unit to transmit re-transmission data within a range not exceeding a reordering threshold of a corresponding receiving terminal sequentially using an antenna group having the highest priority first.

In accordance with another aspect of the present invention, there is provided a method for processing auto repeat request, including: storing reordering thresholds of each receiving terminal and retransmission data; assigning a priority to a plurality of antenna groups in ascending order of a bit error rate of a wireless channel of each antenna group and managing the plurality of antenna groups based on the priorities; and transmitting retransmission data within a range not exceeding a reordering threshold of a corresponding receiving terminal sequentially using an antenna group having the highest priority first.

The apparatus and method for processing an auto repeat request may operate at a MAC protocol of a high speed wireless transmitting system for transmitting and receiving data through a plurality of antennas having different channel characteristics.

Advantageous Effects

In accordance with the present invention, it is possible to reduce retransmission data error and retransmission times by assigning a priority to antenna groups in ascending order of a bit error rate thereof and transmitting the retransmission data sequentially using an antenna group having the highest priority first within a range not exceeding a reordering threshold.

BEST MODE FOR CARRYING OUT THE INVENTION

The advantages, features and aspects of the invention will become apparent from the following description of the embodiments with reference to the accompanying drawings, which is set forth hereinafter.

Figure 1:
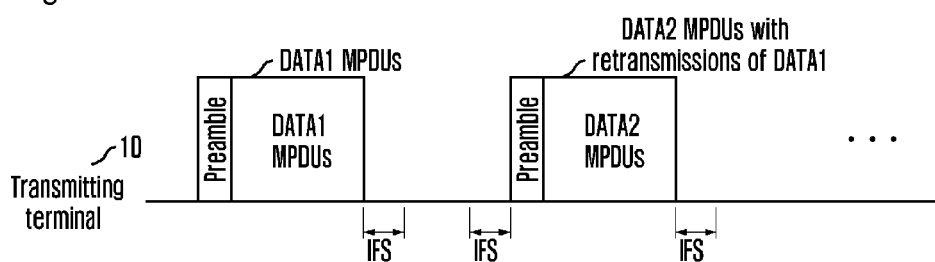
FIG. 1 is a diagram illustrating a procedure for transmitting and receiving a wireless protocol data and a respond frame in a multiple input multiple output (MIMO) antenna system.

FIG. 1 is a diagram illustrating a procedure for transmitting and receiving a wireless protocol data and a respond frame in a multiple input multiple output (MIMO) antenna system.

In the MIMO system, data are transmitted or received based on a time division multiple access (TDMA) scheme. In the TDMA scheme, a predetermined user access a wireless channel and transmits data through the wireless channel during a predetermined time slot that is given by dividing the same frequency by a small time unit.

That is, a transmitting terminal 10 transmits data through an allocated wireless channel, and a receiving terminal 20 receives the data from the transmitting terminal 10 in the TDMA scheme.

The receiving terminal 20 transmits an ACK frame for the received data if the receiving terminal 20 does not receive data from the transmitting terminal 10 during a predetermined time interval, such as inter frame space (IFS).

The transmitting terminal 10 receives the ACK frame and obtains data transmission information by analyzing the received ACK frame. Then, the transmitting terminal 10 retransmits corresponding data or transmits new data after the IFS according to the obtained data transmission information.

Here, the transmission data stream includes a preamble and medium access control (MAC) data, which is required by a physical layer.

Figure 2:
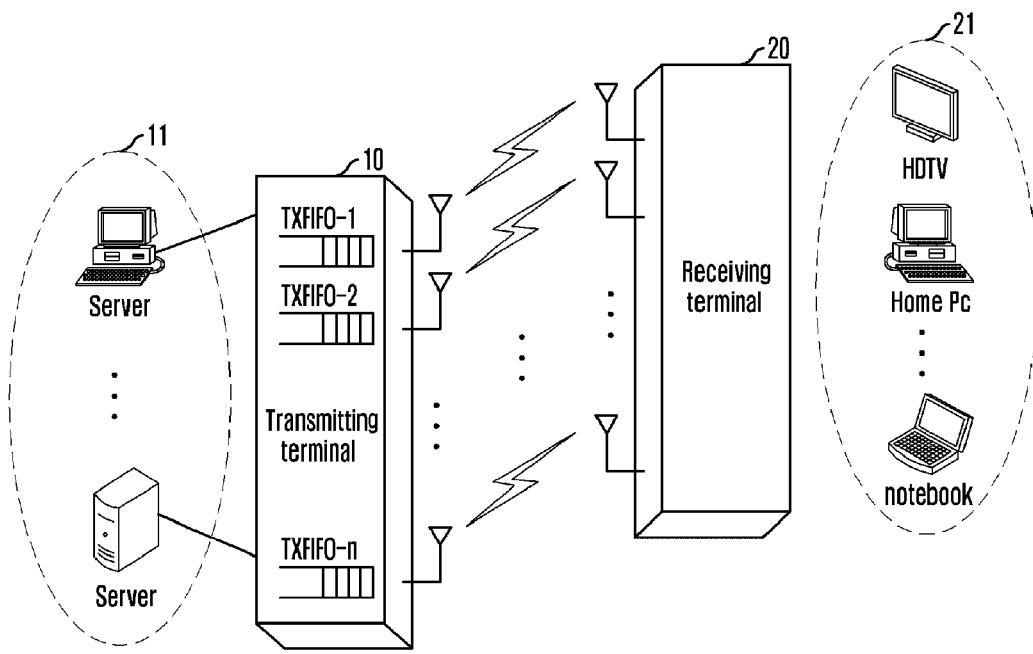
FIG. 2 is a diagram illustrating a system having multiple antennas for transmitting data at high speed where the present invention is applied.

FIG. 2 is a diagram illustrating a system having multiple antennas for transmitting data at high speed where the present invention is applied.

As shown in FIG. 2, the system includes an Internet 11 having a plurality of servers for providing services, a transmitting terminal 10 having a multi-antenna, a receiving terminal 20 having a multi-antenna, and a home network 21 for receiving services. The home network 21 may be the Internet. The transmitting terminal 10 transmit data to the receiving terminal 20 through wireless channels having different characteristics.

The transmitting terminal 10 includes a plurality of independent transmission memories TX FIFO in order to apply data to corresponding antennas according to its unique characteristic.

The transmitting and receiving terminals 10 and 20 include multiple antennas and use different modulation and coding schemes for each of the multiple antennas according to characteristics of a wireless channel from a physical layer.

That is, a data transmit rate is decided based on a level of a modulation and coding scheme (MCS). A MCS level of each antenna is decided in consideration of QoS and wireless channel characteristics.

Priorities are decided in order of antennas having better performance according to the MCS level. After deciding the priorities, the priorities of antennas are grouped according to system environment.

Here, each antenna group which includes at least one of antennas has a different bit error rate. Also, each receiving terminal 20.

Also, a reordering threshold of each receiving terminal 20 is defined in advance. Here, the reordering threshold refers an amount of MPDUs which an antenna group can receive at one time.

Figure 3:
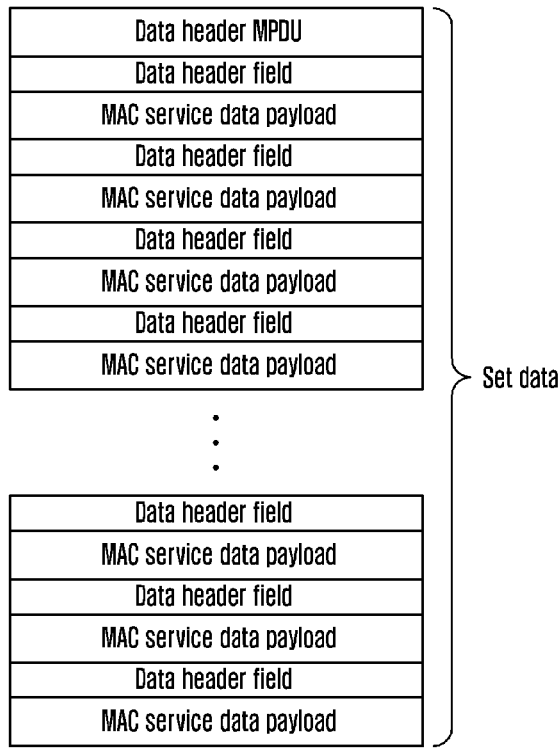
FIG. 3 is a diagram illustrating an aggregated MPDU in accordance with an embodiment of the present invention.

FIG. 3 is a diagram illustrating an aggregated MPDU in accordance with an embodiment of the present invention.

As shown in FIG. 3, the aggregated MAC protocol data unit (MPDU) is a basic unit that supports a MAC layer. A response frame thereof is a MPDU having an acknowledgement (ACK) bit map for the aggregated MPDU.

It is preferable to use a predetermined value defined according to a system environment as the maximum length of downlink data and the maximum length of the uplink data.

Figure 4:
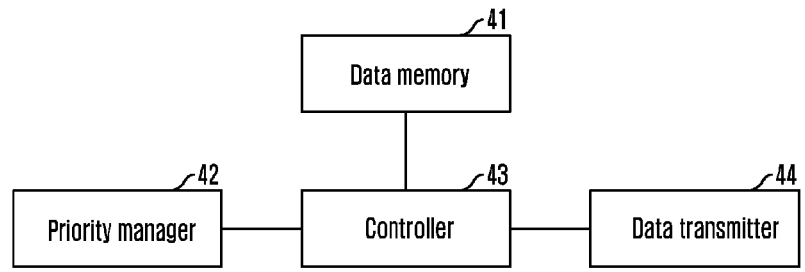
FIG. 4 is a diagram illustrating an apparatus for processing an auto repeat request (ARQ) in a MIMO system in accordance with an embodiment of the present invention.

FIG. 4 is a diagram illustrating an apparatus for processing an auto repeat request (ARQ) in a MIMO system in accordance with an embodiment of the present invention.

As shown in FIG. 4, the apparatus for processing an ARQ according to the present embodiment includes a data memory 41, a priority manager 42, a controller 43, and a data transmitter 44. The data memory 41 stores reordering thresholds of each receiving terminal and retransmission data. The priority manager 42 assigns priorities to a plurality of antenna groups in ascending order of a low bit error rate of a wireless channel of each antenna group and manages the plurality of antennas groups based on the assigned priorities. The controller 43 controls the data transmitter 44 to retransmit data within a predetermined range not exceeding the reordering threshold of a corresponding receiving terminal sequentially using an antenna group having the high priority first. The data transmitter 44 transmits retransmission data.

The data transmitter 44 includes transmission buffers as many as the number of antenna groups and stores data in a transmission buffer of each antenna group not to exceed the reordering threshold of the receiving terminal 20.

Hereinafter, the operation of the controller 43 will be described in detail.

In order to describe the operation of the controller 43, assumptions are made as follows. A system has five antenna groups A, B, C, D, and E. The antenna group A has the highest priority, the antenna group B has the next highest priority, and the antenna group C has the next highest priority, so forth. Q denotes a reordering threshold of a receiving terminal.

At first, the controller 43 controls the data transmitter 44 to transmit retransmission data by storing retransmission data as much as Q in a transmission buffer corresponding to the antenna group A having the highest priority.

If any retransmission data is left, the controller 43 controls the data transmitter 44 to transmit retransmission data by storing retransmission data as much as Q in a transmission buffer corresponding to the antenna group B having the next highest priority.

As described above, retransmission data is transmitted sequentially using the antenna group having the highest priority first, thereby reducing retransmission errors and retransmission times.

Figure 5:
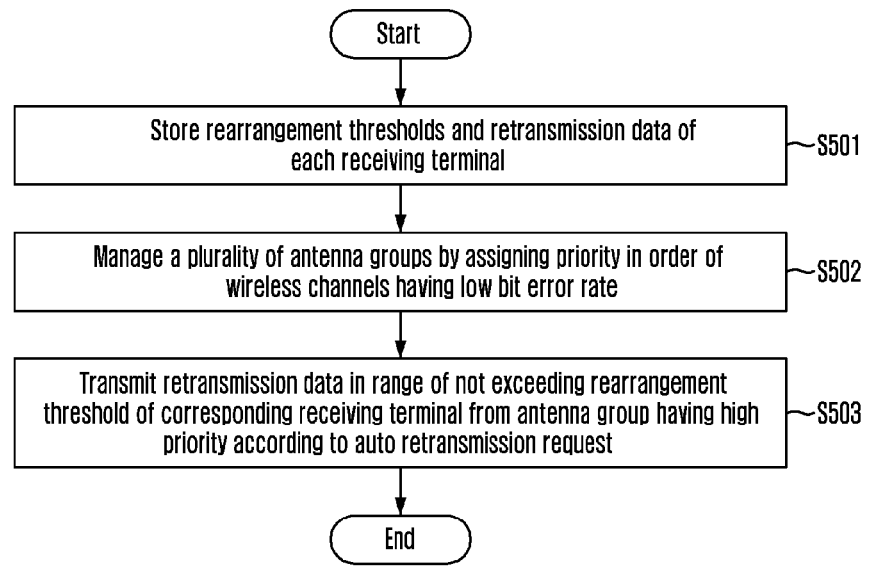
FIG. 5 is a flowchart illustrating a method for processing an auto repeat request (ARQ) in a MIMO system in accordance with an embodiment of the present invention.

FIG. 5 is a flowchart illustrating a method for processing an auto repeat request (ARQ) in a MIMO system in accordance with an embodiment of the present invention.

At step S501, reordering thresholds of each receiving terminal and retransmission data are stored.

At step S502, a priority is assigned to a plurality of antenna groups in ascending order of a bit error rate of a wireless channel of each antenna group, and the plurality of antenna groups are managed based on the assigned priority.

At step S503, retransmission data is transmitted sequentially using antenna groups in descending order of the priority thereof within a range not exceeding a reordering threshold of a corresponding receiving terminal according to the ARQ. That is, an antenna group having the highest priority is used first to transmit retransmission data.

Hereinafter, a method for processing ARQ according to the present embodiment will be described with reference to FIG. 6.

Figure 6:
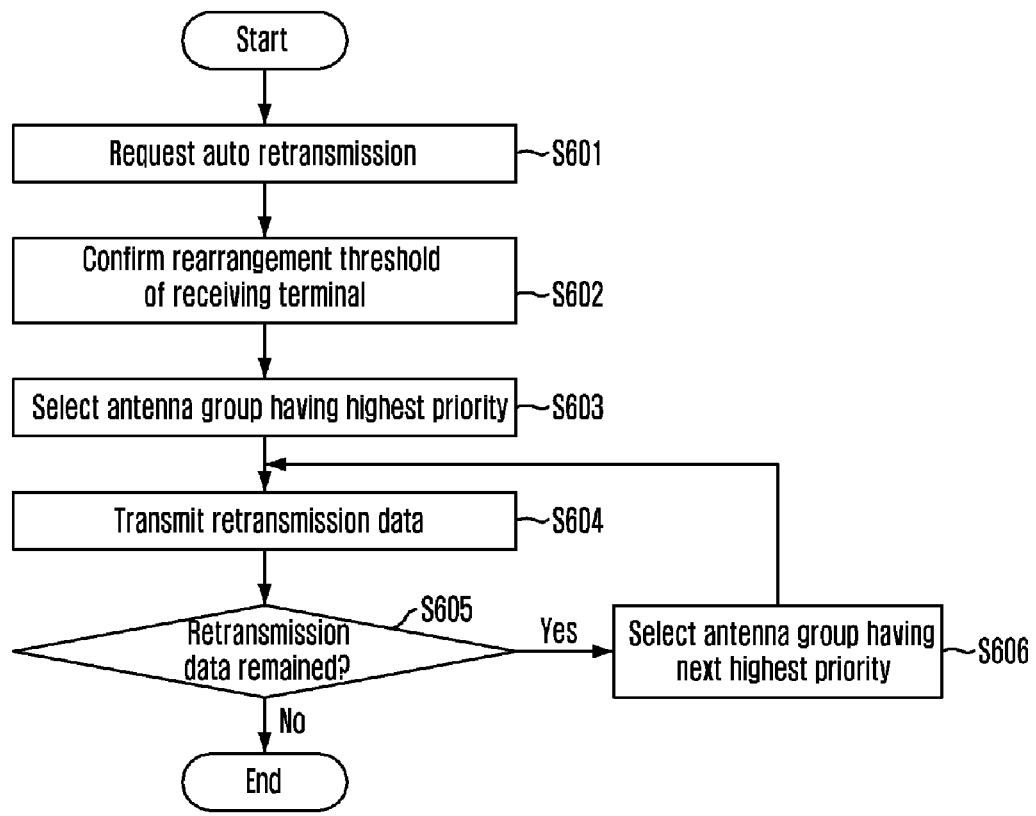
FIG. 6 is a flowchart illustrating a method for processing an auto repeat request of a MIMO system in accordance with an embodiment of the present invention.

FIG. 6 is a flowchart illustrating a method for processing an auto repeat request of a MIMO system in accordance with an embodiment of the present invention.

At steps S601 and S602, a reordering threshold of a receiving terminal is confirmed according to ARQ.

At steps S603 and S604, retransmission data is transmitted by selecting an antenna group having the highest priority.

At step S605, it is determined whether retransmission data remains or not.

If retransmission data remains at step S605, the remaining retransmission data is transmitted by selecting an antenna group having the next highest priority at steps S606 and S604.

If retransmission data remains after transmitting the remaining retransmission data through an antenna group having the lowest priority, the remaining retransmission data is transmitted using an antenna group having the highest priority again.

If no retransmission data remains at step S605, the method for processing ARQ ends.

The method of the present invention may be programmed in a computer language. Codes and code segments constituting the computer program may be easily inferred by a computer programmer skilled in the art. Furthermore, the computer program may be stored in a computer-readable recording medium including all kinds of media such as CD-ROM, RAM, ROM, floppy disk, hard disk and magneto-optical disk, and read and executed by a computer to embody the methods.

The present application contains subject matter related to Korean Patent Application No. 2007-0124388, filed in the Korean Intellectual Property Office on Dec. 3, 2007, the entire contents of which are incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. An apparatus for processing an auto repeat request, comprising:
   a storing unit configured to store reordering thresholds of each receiving terminal and retransmission data;
   a priority managing unit configured to assign a priority to each of a plurality of antenna groups in ascending order of a bit error rate of a wireless channel of each antenna group and manage the plurality of antenna groups based on the priorities;
   a data transmitting unit configured to transmit the retransmission data; and
   a controlling unit configured to control the data transmitting unit to transmit the retransmission data within a range not exceeding a reordering threshold of a corresponding receiving terminal sequentially using an antenna group having the highest priority first.

2. The apparatus of claim 1, wherein the data transmitting unit includes transmission buffers corresponding to each antenna group.

3. The apparatus of claim 2, wherein the controlling unit is configured to store data in a corresponding transmission buffer of an antenna group so that the stored data does not exceed the reordering threshold of the corresponding receiving terminal.

4. The apparatus of claim 1, wherein the reordering threshold is a data amount that a receiving terminal can receive from one antenna group at one time.

5. The apparatus of claim 1, wherein the apparatus operates at a medium access control (MAC) layer.

6. A method for processing an auto repeat request, comprising:
   storing reordering thresholds of each receiving terminal and retransmission data;
   assigning a priority to each of a plurality of antenna groups in ascending order of a bit error rate of a wireless channel of each antenna group and managing the plurality of antenna groups based on the priorities; and
   transmitting the retransmission data within a range not exceeding a reordering threshold of a corresponding receiving terminal sequentially using an antenna group having the highest priority first.

7. The method of claim 6, wherein data is stored in a corresponding transmission buffer of an antenna group in an amount not exceeding the reordering threshold of the corresponding receiving terminal.

8. The method of claim 6, wherein transmitting the retransmission data includes:
   confirming a reordering threshold of the corresponding receiving terminal according to the auto repeat request;
   transmitting the retransmission data by selecting an antenna group having a highest priority;
   determining whether retransmission data remains or not; and
   transmitting remaining retransmission data by selecting an antenna group having a next priority of the selected antenna group if the retransmission data remains.

9. The method of claim 6, wherein the reordering threshold is a data amount that a receiving terminal can receive from one antenna group at one time.

10. The method of claim 6, wherein the method for processing the auto repeat request is performed at a MAC layer.

* * * * *